July 14, 1936. H. KOTT 2,047,638
HUMIDITY MEASURING DEVICE
Filed Sept. 1, 1934
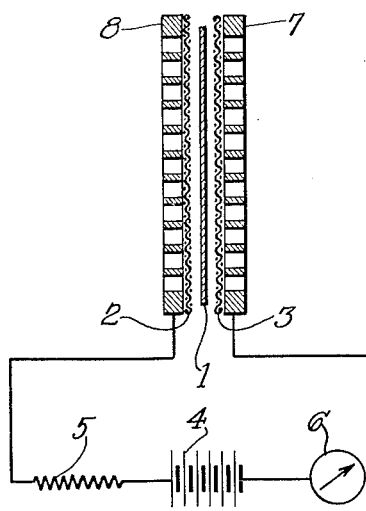
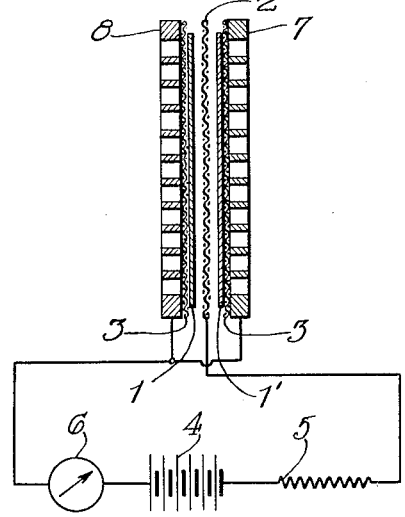
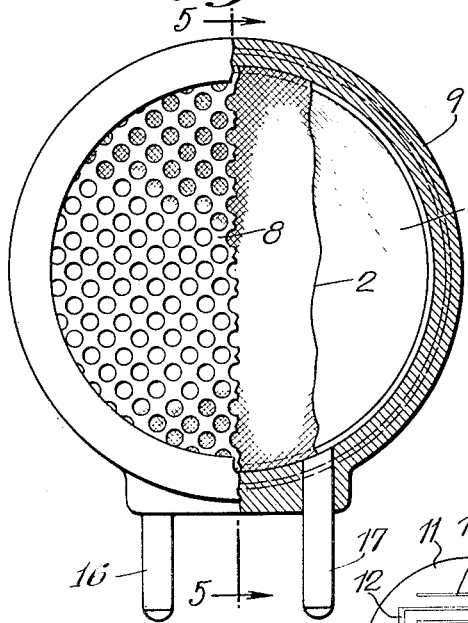
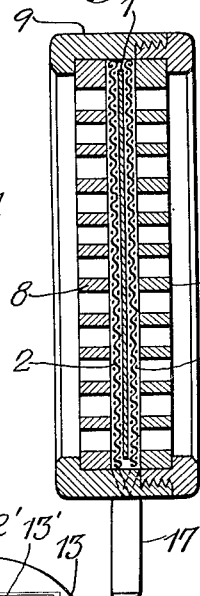
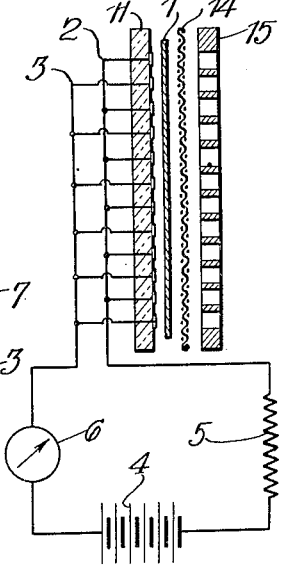
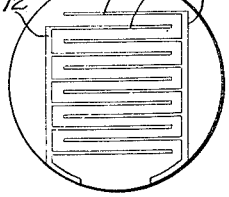
INVENTOR
HERMANN KOTT
ATTORNEYS Patented July 14, 1936

2,047,638

UNITED STATES PATENT OFFICE 2,047,638

HUMIDITY MEASURING DEVICE

Hermann Kott, New York, N. Y., assignor, by mesne assignments, to Ion Corporation, Short Hills, N. J., a corporation of New Jersey Application September 1, 1934, Serial No. 742,445

12 Claims. (Cl. 201—76)

This invention relates to humidity measuring devices and more particularly to electrically operating humidity measuring devices. Heretofore in the art many attempts have been made to develop a humidity measuring device wherein the moisture content of an atmosphere is utilized as a means for varying the electrical conductivity of an electrical resistance element either by absorption or adsorption of the moisture by such element. Such devices as have heretofore been developed, however, have not been commercially practicable for the reason that the electrical resistance elements provided, while absorptive or adsorptive towards the moisture content of the atmospheres in contact therewith, were not selective in the proportion of moisture thereby absorbed or adsorbed and the resultant electric currents passing by the element bear no relative relation to the moisture content of the atmosphere. It is not sufficient in such devices that the electrical resistance element possess the mere power to absorb or adsorb moisture from an atmosphere in contact therewith. The resultant absorbed or adsorbed moisture must bear a constant relation to the moisture content of the gas before an accurate determination of the humidity of the gas may be obtained.

In many chemical processes, air conditioning apparatus, humidifier devices and the like it is essential that the relative humidity of atmospheres be accurately and rapidly determined. It is preferable in such processes, apparatus and devices that the determination of the relative humidity of the atmosphere be made either continuously or at periodic intervals. It is also preferable that the determination of the relative humidity of the atmospheres be made with such a degree of accuracy and speed as will permit the regulation or control of the moisture content of the atmospheres within prescribed or desired limitation.

One of the objects of the present invention is to provide an electrical resistance element, the electrical resistance of which is variable with respect to the absorbed moisture content thereof, which element is characterized by the feature of possessing at any given temperature and pressure a relative humidity as a result of the absorption of moisture from an atmosphere in contact therewith which is a constant with respect to the relative humidity of the said atmosphere.

Another object of the present invention is to provide an improved means for electrically determining the relative humidity of gases, the said means being operative either continuously or periodically.

Still another object of the present invention is to facilitate the determination of the relative humidity of atmospheres and the regulation and control thereof.

Other objects and advantages will be apparent as the invention is more fully disclosed. In accordance with the above identified objects and advantages I have devised a novel type of electrical resistance element which is characterized by the property of rapid absorption and loss of absorbed moisture to the atmosphere in contact therewith and further characterized by the property of retaining at any given temperature and pressure a moisture content which is a constant with respect to the moisture content of the atmosphere in contact therewith. The electrical conductivity of this element varies with respect to its moisture content. Accordingly, by passing an electric current through the element while it is in contact with an atmosphere the variation in the current incident to the changes in the moisture content of the electrical resistance element may be utilized to determine, regulate or control the moisture content of the said atmosphere. A simple calibration to determine the relative humidity constant of the said element is all that is necessary to enable the accurate determination, regulation or control of the humidity of the said atmosphere.

Before further disclosing the nature and scope of the present invention reference should be made to the accompanying drawing wherein:—

Fig. 1 is a schematic view partly in section illustrating one specific embodiment of the present invention; Fig. 2 is a second specific embodiment; Fig. 3 is a third specific embodiment; Fig. 4 is a front elevation partly in section of a device constructed in accordance with the specific embodiment of Fig. 1; Fig. 5 is a section along plane 5—5 of Fig. 4; and Fig. 6 is a front elevation of the electrode structure of the modification of Fig. 3.

Referring to the drawing, Figs. 1, 2 and 3 illustrate in schematic detail three specific modifications of the present invention. In accordance with the modification of Fig. 1 the electrical resistance element 1 of the present invention is disposed intermediate two mesh type electrodes 2 and 3, the terminals of electrodes 2 and 3 being connected to opposite poles of an electric current supply source 4 with a limiting resistance 5 in series with one of said electrodes and a meter 6 in series with the other of said electrodes.

The electric resistance element 1 of the present invention is comprised substantially of a relatively thin plate, strip or layer of cellulosic material impregnated with glycerine. Cellulose is a dielectric insulator but due to its cellular or fibrous condition is normally absorptive to water. The absorption and loss of water by cellulose is usually accompanied by an expansion and contraction of the cellulose. In general the relative humidity of the cellulose bears no definite or constant relation with respect to the relative humidity of atmospheres contacting therewith, although it is known that with any given relative humidity of the atmosphere the cellulose will assume a relative humidity which is in equilibrium with the atmosphere under the conditions of temperature and pressure existing. The rate at which this equilibrium relative humidity is reached depends primarily upon the physical condition of the cellulose and upon the thickness of the same.

In the type of cellulose known in the art as regenerated cellulose it is customary to impregnate the cellulose with glycerine which serves as a lubricant during the expansion and contraction of the cellulose incident to changes in temperature and to the absorption of water therein. It is known that the presence of glycerine in the regenerated cellulose markedly affects the relative humidity of the cellulose, and it has been determined that when the amount of glycerine ranges from about 12 to 14% that the relative humidity of the cellulose then approximates that of an air atmosphere at the same temperature. This heretofore has been considered a defect in this cellulose product and in order to overcome this defect this glycerine impregnated regenerated cellulose product is water-proofed against moisture absorption. As a result of this waterproofing the expansion and contraction of the regenerated cellulose incident to moisture absorption is eliminated. The expansion and contraction of the material incident to temperature changes is slight and not detrimental.

In accordance with the present invention, I utilize this property of the glycerine impregnated regenerated cellulose product to absorb moisture from an atmosphere in the forming of electrical resistance element 1 by properly proportioning the glycerine content of the regenerated cellulose to obtain thereby a relative humidity which is a definite constant with respect to the relative humidity of the atmosphere to be tested and I may thereafter, by passing a suitable electric current through the cellulose, determine in terms of electrical energy the relative humidity of an atmosphere in contact with the cellulose resistance element.

In order to eliminate as far as practicable the time element involved in absorbing or losing moisture from and to the said atmosphere until an equilibrium and constant relative humidity is reached in the resistance element, I preferably shape the said resistance element so as to provide a relatively large surface area in proportion to its mass and thickness. And in order to overcome the difficulties attending this shaping of the resistance element in the passage of an electric current therethrough, I preferably provide for the passage of an electric current therethrough at a plurality of points or over an extended surface area. The electrode structure, however, must be such that the surface area of the resistance element that is exposed to the atmosphere is sufficient to permit the rapid absorption and loss of moisture from the resistance element in respect to variations in the relative humidity of the atmosphere.

These conditions are met by the assembly of elements schematically illustrated in Fig. 1. Resistance element 1 is a relatively thin sheet of regenerated cellulose impregnated with glycerine. Electrodes 2 and 3 are comprised of wire mesh screen. It is immaterial for the purposes of the present invention whether resistance element 1 or electrodes 2 and 3 are round, square, rectangular or of any other shape and the precise dimensions or area included within such shape is immaterial. Means must be provided to maintain the abutting faces of the electrodes 2 and 3 in good electrical contact with opposing faces of resistance element 1. This may be most readily accomplished by providing perforated plate elements 7 and 8 and threaded collar 9 engaging the outside periphery of each of said plate members. Collar 9 should be comprised of dielectric insulating material.

In Fig. 2 I have illustrated a modification in which I dispose a relatively thin sheet 1—1' of the electric resistance element 1 on opposite faces of a mesh or screen electrode 2 and dispose electrodes 3—3 against the outside faces of the resistance elements 1—1'. This arrangement permits me to use an electrically conducting collar 9 to frictionally engage the adjacent faces of the resistant elements and electrodes. In this structure I also preferably employ plate elements 7 and 8.

In the structure illustrated in Fig. 3 electrodes 2 and 3 are deposited upon the face of a dielectric insulating plate 11 in relative close spaced relationship over an extended surface area. As illustrated it is preferred to shape the electrodes in a grid like structure with a pair of parallel spaced arms 12 and 13, the gap therebetween being reduced by means of arms 12' and 13' extending from one electrode towards the other in parallel close spaced relationship. Electric resistance element 1 of the present invention is then laid upon the grid electrodes and retained in close contact therewith by means of screen element 14 and perforated plate element 15. A dielectric threaded collar 9 as in Fig. 1 may be utilized to bind the parts together.

I have found that it is preferable to comprise electrodes 2 and 3 of identical electrically conductive material. Where there is a difference in composition between electrodes 2 and 3 a galvanic action through electric resistance element 1 will be obtained. This galvanic action may be limited by reversing the polarities of the electrodes from source 4. Electrodes 2 and 3 preferably should be comprised of material resistant to corrosion or disintegration by the atmosphere in which the device is to be employed. In determining the humidity of air substantially free of corrosive gases except oxygen I have found that copper is suitable. Where the moisture content of the atmosphere is corrosive however, it is preferable to at least superficially coat the copper with a metal which more strongly resists oxidation, such as chromium, nickel, tin, gold or platinum.

As an illustration of the present invention, I have indicated in Figs. 4 and 5 the structural details of an apparatus suitable for the determining of the humidity of an air atmosphere constructed in accordance with the specific embodiment schematically illustrated in Fig. 1 as shown. Referring to Fig. 4, the electrical resistance element 1 is comprised of a circular sheet of regenerated cellulose containing approximately 14% glycerine. The diameter of the sheet is approximately two inches and the thickness is approximately .003 to .006 inch. Electrodes 2 and 3 are each comprised of copper screen approximately 100 mesh and having a diameter approximately that of resistance element 1. Plate elements 7 and 8 are comprised of any suitable perforated material, such as brass or copper, the number and size of the perforated openings therein being at least sufficient to provide for free access of the atmosphere to the interior of the device on opposite faces of resistance element 1 through the mesh or screen electrodes 2 and 3. Threaded collar member 9 is preferably comprised of dielectric insulating material such as that known in the art as bakelite. Bayonet pin contact members 16 and 17 are provided in any convenient manner to bring the terminals of electrodes 2 and 3 to the outside of threaded collar 9.

The electrical characteristics of the device of the present invention is such that upon the application of an electrical potential to electrodes 2 and 3 a current will flow through the resistance element 1, the strength of the current being proportional to the relative humidity of the resistance element 1. When the relative humidity of resistance element 1 approximates zero the resistance element will pass little or no current, but as the relative humidity of the resistance element 1 approximates 100% a relatively large current will flow thereacross. It is therefore, advisable to employ in series with the electrodes a limiting resistance 5. The actual electrical potential applied to electrodes 2 and 3 may vary widely without departing essentially from the nature and scope of the present invention. However, a constant potential should be maintained and the device calibrated upon the basis of such known and constant potential.

By the provision of a suitable limiting resistance 5 the device may be adapted to be energized by electric potentials up to 220 volts. In general where the relative humidity of the atmosphere is relatively high lower electrical potentials may be employed.

Where a direct reading and visual indication of the relative humidity as evidenced by the amount of current flowing through resistance element 1 is desired, meter 6 may be employed. If desired the current flow in the circuit may be utilized to energize mechanism controlling or regulating the degree of humidity of the atmosphere or may be employed to energize mechanism making a continuous record or a periodic record of the same.

Having broadly and specifically disclosed the present invention it is apparent that there may be many modifications of the same without departing from the nature and scope thereof and all such modifications and departures are contemplated as may fall within the scope of the following claims.

What I claim is:

1. An electrical resistance element comprised of porous, moisture absorbent cellulosic material impregnated with glycerine.

2. An electrical resistance element comprised of regenerated cellulose impregnated with glycerine.

3. An electrical resistance element comprised of regenerated cellulose impregnated with from 12% to 14% of glycerine.

4. A humidity measuring device including in combination an electrical resistance element comprised of porous moisture absorbent cellulose impregnated with glycerine and means to pass an electric current therethrough.

5. A device for determining and controlling the relative humidity of atmospheres including in combination an electrical resistance element comprised of porous moisture absorbent cellulose impregnated with at least sufficient glycerine to impart to the cellulose a relative humidity factor which is at least a constant with respect to the atmosphere contacting therewith at the same temperature, and means to pass an electric current through said element.

6. A device for determining and controlling the relative humidity of air which includes in combination an electrical resistance element comprised of porous, moisture absorbent cellulose containing between 12% and 14% glycerine and means to pass an electric current therethrough.

7. In combination, a thin section of porous, moisture absorbent cellulose impregnated with glycerine having a surface area relatively large in proportion to its mass and thickness, and pair of screen type electrodes contacting upon opposite faces thereof, means to impress an electric potential across said electrodes.

8. In combination, a mesh type electrode, a thin section of porous, moisture absorbent cellulose impregnated with glycerine having a surface area relatively large in proportion to its mass and thickness disposed on opposite sides of said electrode and in electrical contact therewith and a pair of perforated plate electrodes one disposed adjacent the outer face of each of said sections and in electrical contact therewith, said plate electrodes being electrically connected in parallel, means to impress an electric potential across said mesh electrode and plate electrodes.

9. In combination, a dielectric plate, a pair of close spaced electrodes of extended surface area disposed on one face of said plate, a thin section of porous, moisture absorbent cellulose impregnated with glycerine disposed over said electrodes and in electrical contact therewith over said extended surface area, means to impress an electric potential across said electrodes.

10. In a humidity measuring device an electrical resistance element comprised of porous, moisture absorbent celelulose impregnated with glycerine, the surface area of said element being relatively large with respect to its mass and thickness.

11. In a humidity measuring device an electrical resistance element comprised of porous, moisture absorbent cellulose impregnated with 12 to 14% glycerine, the surface area of said element being relatively large with respect to its mass and thickness.

12. In a humidity measuring device an electrical resistance element comprised of regenerated cellulose impregnated with 12 to 14% glycerine, the surface area of said element being relatively large with respect to its mass and thickness.

HERMANN KOTT.